US009116602B2

(12) United States Patent
Kotler et al.

(10) Patent No.: US 9,116,602 B2
(45) Date of Patent: Aug. 25, 2015

(54) PROVIDING CUSTOMIZATION OF CONTEXT BASED MENUS

(75) Inventors: Matthew Kotler, Sammamish, WA (US); Erez Kikin Gil, Redmond, WA (US); Andrew Hockman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 13/549,397

(22) Filed: Jul. 13, 2012

(65) Prior Publication Data

US 2013/0019203 A1    Jan. 17, 2013

Related U.S. Application Data

(60) Provisional application No. 61/507,983, filed on Jul. 14, 2011, provisional application No. 61/556,945, filed on Nov. 8, 2011.

(51) Int. Cl.
*G06F 3/0482* (2013.01)
*G06F 3/0488* (2013.01)
*G06F 3/0489* (2013.01)

(52) U.S. Cl.
CPC ............ *G06F 3/0482* (2013.01); *G06F 3/0488* (2013.01); *G06F 3/04886* (2013.01); *G06F 3/04895* (2013.01)

(58) Field of Classification Search
CPC ..................................................... G06F 3/0482
USPC ......................................................... 715/811
See application file for complete search history.

(56) References Cited

U.S. PATENT DOCUMENTS

| 6,073,036 | A  | * | 6/2000  | Heikkinen et al. ......... 455/550.1 |
|-----------|----|---|---------|-------------------------------------|
| 6,281,879 | B1 |   | 8/2001  | Graham                              |
| 6,501,491 | B1 |   | 12/2002 | Brown et al.                        |
| 6,542,164 | B2 |   | 4/2003  | Graham                              |
| 6,828,988 | B2 |   | 12/2004 | Hudson et al.                       |
| 6,925,598 | B2 | * | 8/2005  | Melhem et al. ............... 715/210 |
| 6,925,611 | B2 |   | 8/2005  | SanGiovanni                         |
| 6,941,521 | B2 | * | 9/2005  | Lin et al. ....................... 715/762 |
| 7,158,123 | B2 | * | 1/2007  | Myers et al. .................. 345/173 |
| D563,972  | S  |   | 3/2008  | Sherry                              |
| 7,533,340 | B2 |   | 5/2009  | Hudson et al.                       |
| 7,570,943 | B2 | † | 8/2009  | Sorvari                             |
| 7,710,409 | B2 |   | 5/2010  | Robbin et al.                       |
| 7,712,049 | B2 |   | 5/2010  | Williams et al.                     |

(Continued)

OTHER PUBLICATIONS

"Context Menus and Sub-Menus", Retrieved at <<http://ignorethecode.net/blog/2009/03/21/context-menus-sub-menus/>>, Mar. 21, 2009, pp. 9.

(Continued)

*Primary Examiner* — William Bashore
*Assistant Examiner* — Nathan Shrewsbury
(74) *Attorney, Agent, or Firm* — Steve Crocker; Jim Ross; Micky Minhas

(57) ABSTRACT

Context based menus are customizable to extend features to meet user demand. An application providing the context based menu reads a custom configuration from an XML file or receives input through a user interface to construct a context based menu. The custom configuration hosts attribute information for placement of controls, visualization or controls, and/or behavior of controls in the menu. Custom configuration is editable and provides features to add and remove controls from a default context based menu.

18 Claims, 9 Drawing Sheets

(56) References Cited

U.S. PATENT DOCUMENTS

| | | | |
|---|---|---|---|
| 7,827,495 B2* | 11/2010 | Bells et al. | 715/744 |
| 7,895,531 B2 | 2/2011 | Radtke et al. | |
| 7,941,758 B2* | 5/2011 | Tremblay | 715/765 |
| 8,019,843 B2* | 9/2011 | Cash et al. | 709/223 |
| 8,239,882 B2† | 8/2012 | Dhanjal | |
| 8,245,156 B2 | 8/2012 | Mouilleseaux et al. | |
| 8,418,165 B2* | 4/2013 | Hoff et al. | 717/168 |
| 8,671,343 B2* | 3/2014 | Oberstein | 715/702 |
| 2003/0184585 A1* | 10/2003 | Lin et al. | 345/763 |
| 2004/0113941 A1* | 6/2004 | Sliwa et al. | 345/744 |
| 2004/0178994 A1* | 9/2004 | Kairls, Jr. | 345/173 |
| 2004/0212601 A1* | 10/2004 | Cake et al. | 345/173 |
| 2005/0216834 A1† | 9/2005 | Gu | |
| 2006/0026535 A1* | 2/2006 | Hotelling et al. | 715/863 |
| 2006/0073814 A1 | 4/2006 | Allen et al. | |
| 2007/0055936 A1* | 3/2007 | Dhanjal et al. | 715/700 |
| 2007/0250786 A1* | 10/2007 | Jeon et al. | 715/765 |
| 2007/0271528 A1 | 11/2007 | Park et al. | |
| 2008/0059504 A1* | 3/2008 | Barbetta et al. | 707/102 |
| 2008/0228853 A1 | 9/2008 | Brinck et al. | |
| 2009/0037813 A1 | 2/2009 | Newman et al. | |
| 2009/0158134 A1* | 6/2009 | Wang et al. | 715/222 |
| 2010/0295797 A1* | 11/2010 | Nicholson et al. | 345/173 |
| 2010/0295798 A1* | 11/2010 | Nicholson et al. | 345/173 |
| 2010/0295799 A1* | 11/2010 | Nicholson et al. | 345/173 |
| 2010/0295817 A1* | 11/2010 | Nicholson et al. | 345/174 |
| 2010/0299592 A1* | 11/2010 | Zalewski et al. | 715/243 |
| 2010/0299594 A1* | 11/2010 | Zalewski et al. | 715/702 |
| 2010/0299595 A1* | 11/2010 | Zalewski et al. | 715/702 |
| 2010/0299596 A1* | 11/2010 | Zalewski et al. | 715/702 |
| 2010/0299637 A1 | 11/2010 | Chmielewski et al. | |
| 2010/0306702 A1 | 12/2010 | Warner | |
| 2011/0202879 A1 | 8/2011 | Stovicek et al. | |
| 2011/0209093 A1 | 8/2011 | Hinckley et al. | |
| 2011/0252334 A1* | 10/2011 | Verma et al. | 715/744 |
| 2012/0042006 A1† | 2/2012 | Kiley | |
| 2012/0221976 A1 | 8/2012 | Johns | |
| 2012/0242590 A1* | 9/2012 | Baccichet et al. | 345/173 |
| 2013/0019206 A1* | 1/2013 | Kotler et al. | 715/834 |
| 2013/0212503 A1* | 8/2013 | Zalewski et al. | 715/765 |
| 2013/0212504 A1* | 8/2013 | Zalewski et al. | 715/765 |

OTHER PUBLICATIONS

Nguyen, Chuong, "Apple Patent Reveals GUI with Radial Pop-Up Menus in iOS", Retrieved at <<http://www.ubergizmo.com/2010/12/apple-patent-reveals-gui-with-radial-pop-up-menus-in-ios/>>, Feb. 12, 2010, pp. 3.

Koenig, Joerg, "Radial Context Menu", Retrieved at <<http://www.codeproject.com/KB/system/RadialContextMenu.aspx>>, Jul. 21, 2005, pp. 4.

"Pie menu", Retrieved at <<http://web.archive.org/web/20110331143948/http://en.wikipedia.org/wiki/Pie_menu>>, Mar. 31, 2011, pp. 5.

Hopkins, Don, "Pie Menus on Python/GTK/Cairo for OLPC Sugar", Retrieved at <<http://web.archive.org/web/20110515030103/http://www.donhopkins.com/drupal/node/128>>, May 15, 2011, pp. 10.

"Pie in the Sky", Retrieved at <<http://web.archive.org/web/20100702160443/http://jonoscript.wordpress.com/2008/10/28/pie-in-the-sky/>>, Jul. 2, 2010, pp. 33.

Fitzmaurice, et al., "PieCursor: Merging Pointing and Command Selection for Rapid In-place Tool Switching", Retrieved at <<http://www.autodeskresearch.com/pdf/p1361-fitzmaurice.pdf, In Proceedings of the SIGCHI Conference on Human Factors in Computing Systems, Apr. 5, 2008, pp. 10.

"Autodesk Inventor Fusion: Getting Started", Retrieved at <<http://images.autodesk.com/emea_s_main/files/Getting_Started.pdf, Retrieved Date: Dec. 28, 2012, pp. 9-18.

"Wacom Tablets. The basics.", Retrieved at <<http://images.autodesk.com/emea_s_main/files/Getting_Started.pdf>>, Feb. 25, 2011, pp. 11.

"ATOK for Android", Retrieved at <<http://www.youtube.com/watch?v=bZiDbz0aJKk, Jun. 9, 2012, pp. 2.

"Google Reveals Possible Radial Styled Menus Coming to Android", Retrieved at <<http://www.patentbolt.com/2012/07/google-reveals-possible-radial-styled-menus-coming-to-android.html, Jul. 31, 2012, pp. 9.

"Apple Granted a Major Radial Menus Patent for iOS and OS X", Retrieved at <<http://www.patentlyapple.com/patently-apple/2012/08/apple-granted-a-major-radial-menus-patent-for-ios-and-os-x.html>>, Aug. 14, 2012, pp. 12.

"Contributing Actions to the Eclipse Workbench", Retrieved at <<http://www.eclipse.org/articles/article.php?file=Article-action-contribution/index.html>>, Retrieved Date: Aug. 29, 2011, pp. 15.

"How is Blend Extensible?", Retrieved at <<http://www.windowspresentationfoundation.com/?p=743>>, Oct. 10, 2010, pp. 5.

"Customizing Context Menus in Office 2010", Retrieved at <<http://msdn.microsoft.com/en-us/library/ee691832.aspx>>, Nov. 2009, pp. 7.

"Radial Context Menu", Retrieved at <<http://www.codeproject.com/KB/system/RadialContextMenu.aspx>>, Jul. 25, 2005, pp. 3.

"Home Design 3D by LiveCAD : Dream Homes at Your Fingertips", Retrieved at <<http://livecad.net/EN/Products/Home-Design-3D-by-LiveCAD-Press-release.php>>, Retrieved Date: Aug. 29, 2011, pp. 2.

"Compact Control Menu for Touch-Enabled Command Execution", U.S. Appl. No. 13/090438, filed Apr. 20, 2011, pp. 27.

\* cited by examiner
† cited by third party

PROVIDING CUSTOMIZATION OF CONTEXT BASED MENUS

CROSS REFERENCE TO RELATED APPLICATIONS

This application claims the benefit of U.S. Provisional Patent Application Ser. No. 61/507,983 and 61/556,945 filed on Jul. 14, 2011 and Nov. 8, 2011. The disclosures of the provisional patent applications are hereby incorporated by reference for all purposes.

BACKGROUND

With the proliferation of computing and networking technologies, two aspects of computing devices have become prevalent: non-traditional (e.g., mouse and keyboard) input mechanisms and smaller form factors. User interfaces for all kinds of software applications have been designed taking typical screen sizes and input mechanisms into account. Thus, user interactions in conventional systems are presumed to be through keyboard and mouse type input devices and a minimum screen size that enables users to interact with the user interface at a particular precision.

Limited display real estate burdens many portable devices from providing full featured content management functionality. Furthermore, gestural commanding is not efficient using conventional menus including support for limited displays or just taking into account where the user's finger/mouse/pen is. Additionally, display devices such as projectors, monitors, and televisions may lack controls for providing content management functionality. Modern software solutions such as on screen keyboards may be awkward to type and encompass valuable display area. Lack of adequate software solutions for managing content on non-traditional devices largely limit device use to content consumption. Carrying multiple devices for content management and consumption defeats portability and unnecessarily takes away from an enriching singular source for content consumption and management.

Limited screen space in mobile devices provide a significant challenge to delivering effective control interfaces. For example, in conventional systems, a desktop application can provide layered menus to partition functionality across menu structures. Lack of display surface forces developers to cut back on deployed features for in control menus for mobile devices. Customization of controls menus in mobile devices tend to be one of the features missing from mobile systems. Most software deployed in mobile systems tend to be locked and rarely enable the user to adjust control surfaces that provides a diminished user experience compared to conventional counterparts.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing customization of a context based menu. Context based menus may be deployed for variety of scenarios for content management. A context based menu may be customized through a user interface. Furthermore, an application according to embodiments may receive custom configuration from a structured file such as an extended markup language (XML) file for a context based menu. The context based menu may have a radial shape. The application may construct the context based menu according to the custom configuration. The custom configuration may provide positioning and behavior information for controls within the context based menu. Next, the application may present the context based menu on a user interface during content management in response to a user input including a tap, a swipe, a mouse, a keyboard, a pen, a voice, a visual, and a gesture action.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
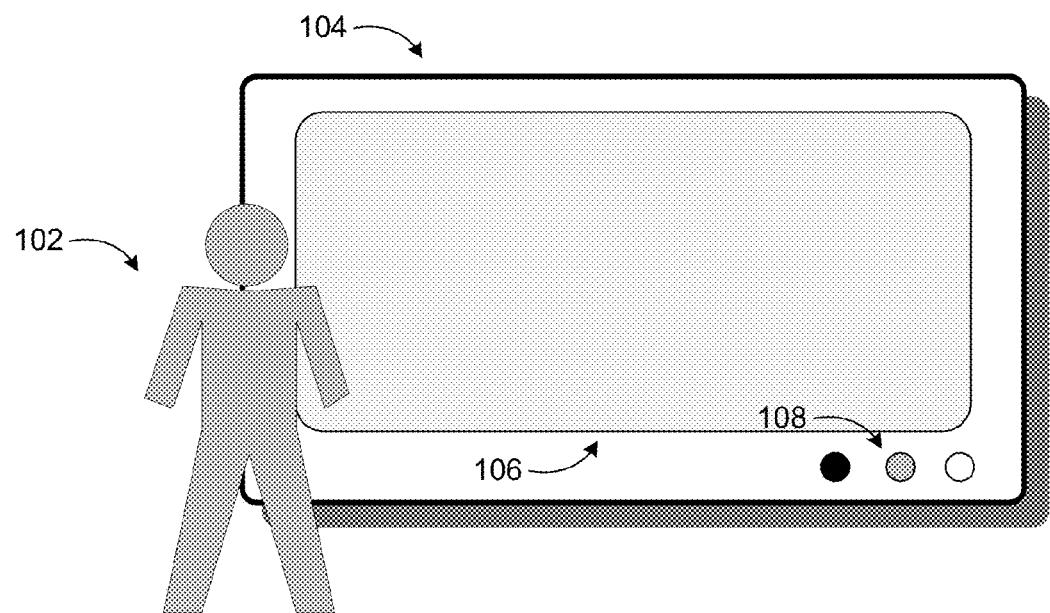
FIG. 1A and 1B illustrate some example devices, where context based menus may be employed.
Figure 1A:
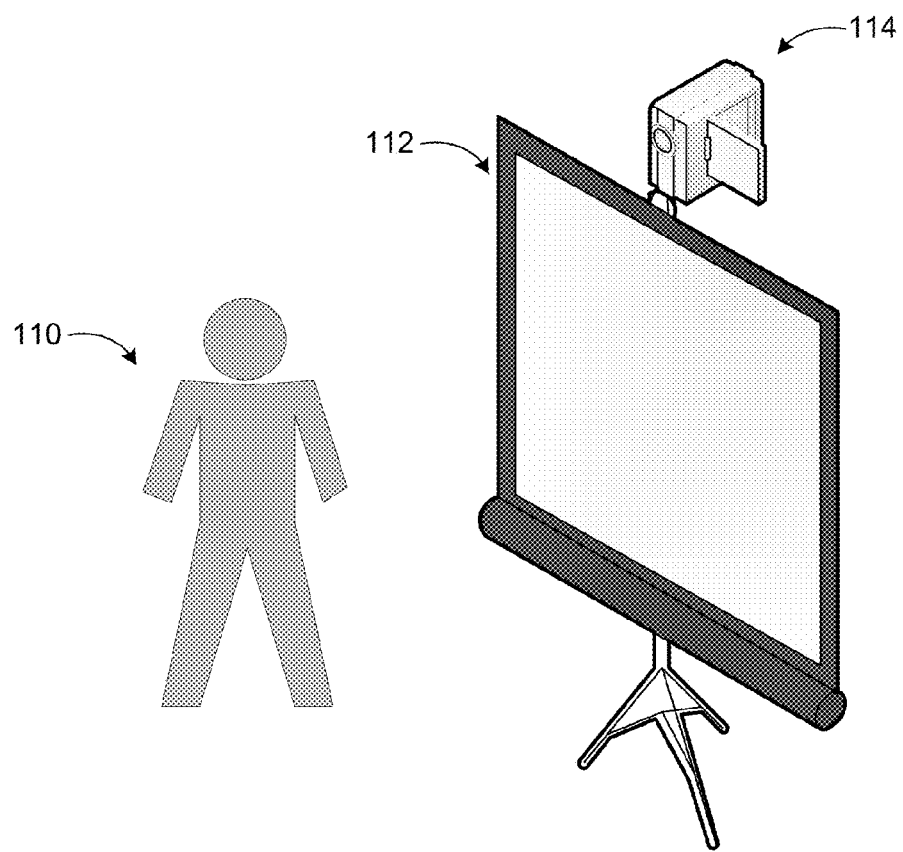

As briefly described above, an application executing on a device may receive custom configuration from an extended markup language (XML) file for a context based menu. The application may construct the context based menu according to the custom configuration and present the menu on a user interface in response to a user input including a tap, a swipe, a mouse, a keyboard, a pen, a voice, a visual, and a gesture action. Alternatively, a user interface may be provided to enable a user to customize the context based menu.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, context based menus, in general, may be used to provide quick access to commonly used commands while viewing or editing displayed content such as documents, emails, contact lists, other communications, or any content (e.g., audio, video, etc.). Context based menus may appear as part of a user interface's regular menu, in a separate viewing pane (e.g., a window) outside or inside the user interface, and so on. Typically, context based menus present a limited set of commands for easy user access, but additional submenus may be presented upon user selection. Commonly used context based menus may appear over the viewed document. A tap or swipe action as used herein may be provided by a user through a finger, a pen, a mouse, or similar device, as well as through predefined keyboard entry combinations or a voice command.

Figure 1B:
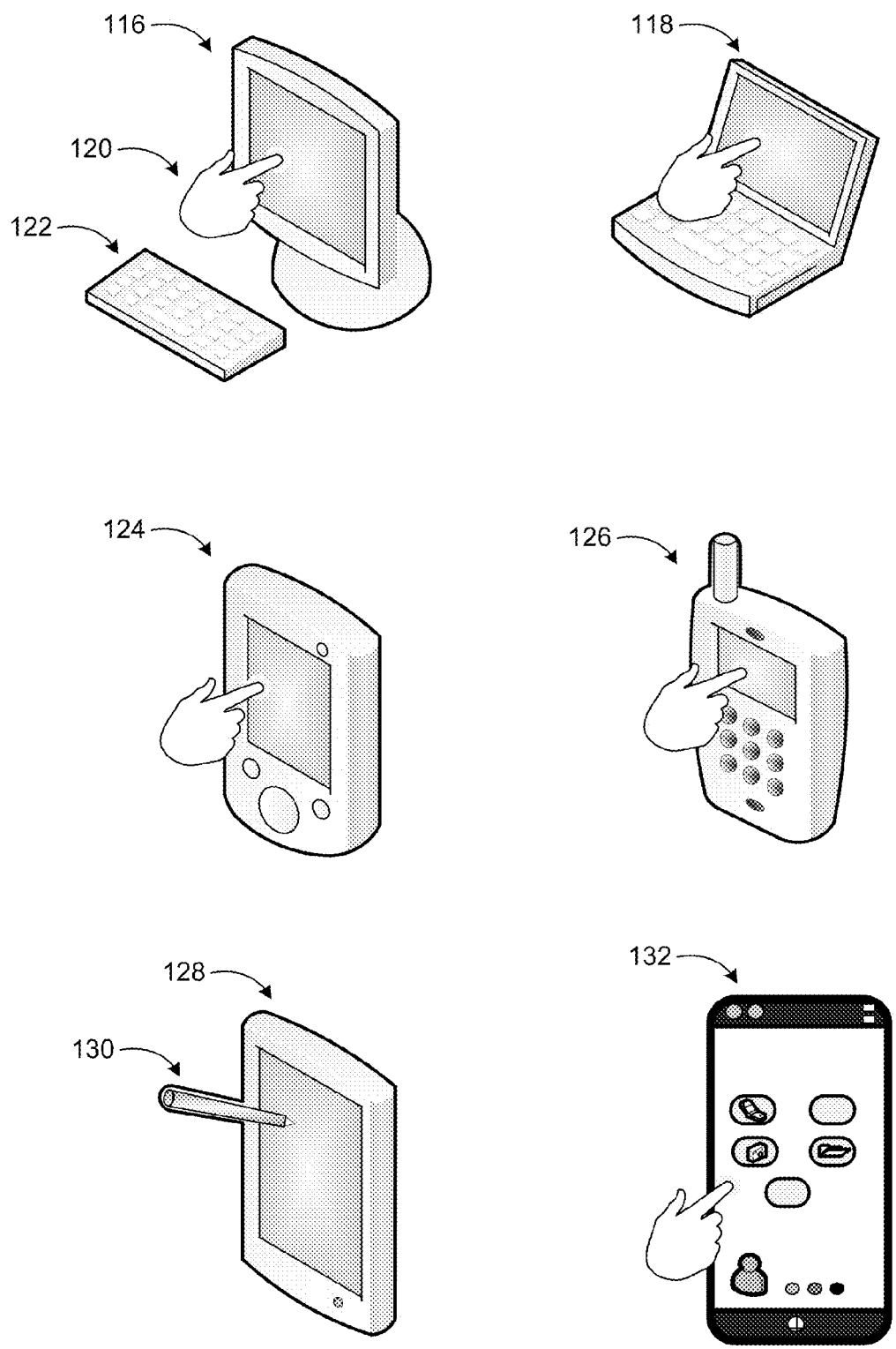

FIG. 1A and 1B illustrate some example devices, where a context based menus may be employed. As touch and gesture based technologies are proliferating and computing devices employing those technologies are becoming common, user interface arrangement becomes a challenge. Touch and/or gesture enabled devices, specifically portable devices, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full control menu may be impractical or impossible. Embodiments are directed to customizing context based menus to enable a user to have a measure of control in placement and behavior of controls.

As mentioned above, smaller available display space, larger content, and different aspect ratios make conventional menus impractical. Existing touch-based devices such as tablet PCs and similar ones are typically directed to data consumption (i.e., viewing). On the other hand, commonly used applications such as word processing applications, spreadsheet applications, presentation applications, and comparable ones are directed to creation (generating and editing documents with textual, graphical, and other content). Currently available context based menus are either invisible most of the time or they block the content when they are visible. A context based menu according to some embodiments may be provided dynamically based on presented content and available space while providing ease of use without usurping much needed display area.

Referring to FIG. 1A and 1B, some example devices are illustrated, where a context based menu may be provided according to embodiments. Embodiments may be implemented in touch and/or gesture enabled devices or others with keyboard/mouse/pen input, with varying form factors and capabilities.

Device 104 in FIG. 1A is an example of a large size display device, where a user interface may be provided on screen 106. Functionality of various applications may be controlled through hardware controls 108 and/or soft controls such as a context based menu displayed on screen 106. A user may be enabled to interact with the user interface through touch actions or gestures (detected by a video capture device). A launcher indicator may be presented at a fixed location or at a dynamically adjustable location for the user to activate the context based menu. Examples of device 104 may include public information display units, large size computer monitors, and so on.

Device 112 in FIG. 1A is an example for use of a context based menu to control functionality. A user interface may be displayed on a screen or projected on a surface and actions of user 110 may be detected as gestures through video capture device 114. The user's gestures may activate a context based menu to manage content as displayed on the device 112.

FIG. 1B includes several example devices such as touch enabled computer monitor 116, laptop computer 118, hand-held computer 124, smart phone 126, tablet computer (or slate) 128, and mobile computing device 132, which may be used for computing, communication, control, measurement, and a number of other purposes. The example devices in FIG. 1B are shown with touch activation 120. However, any of these and other example devices may also employ gesture enabled activation of context based menus to interact with content. In addition, tools such as pen 130 may be used to provide touch input. A context based menu may be controlled also through conventional methods such as a mouse input or input through a keyboard 122.

Figure 2:
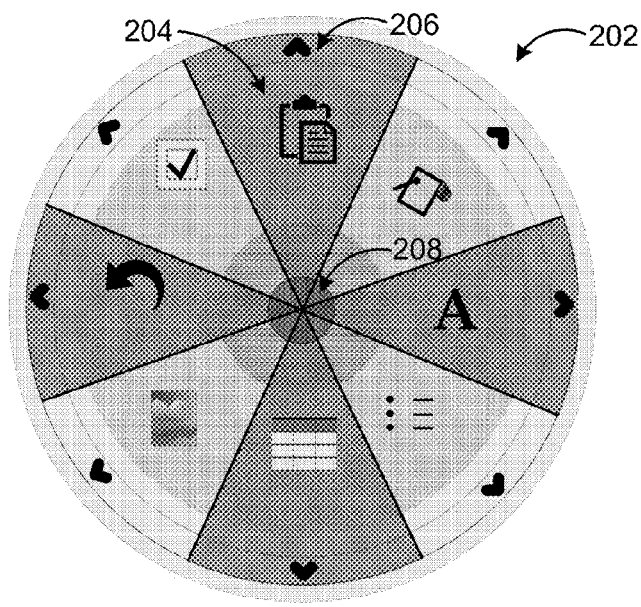
FIG. 2 illustrates example context based menus with custom controls according to embodiments.
Figure 2:
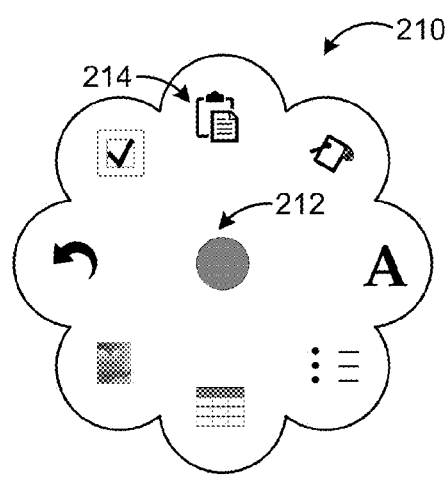

FIG. 2 illustrates example context based menus with custom controls according to embodiments. Diagram 200 displays a context based menu 202 with controls positioned according to a custom configuration from an XML file.

According to some embodiments, the menu 202 may be constructed or customized based on position and behavior information for controls from a custom configuration file. The custom configuration file may be user or developer editable. An application according to embodiments may provide access to the custom configuration through the XML file to enable authenticated users an ability to customize the menu 202. The application may provide an interface for users to edit the custom configuration. Alternatively, the application may provide a client interface to edit the custom configuration through a graphical interface modeling a context based menu.

In addition to specifying which commands are available, the visuals and behavior of those commands on the context based menu may also be customized This may include the icons, labels, etc. Furthermore, customization may include a look of the entire menu (e.g., what color the background or the sub-menu launcher wedges are), so that a user can personalize the look of their menu to their taste. On the behavior side, customization may include aspects such as when a command is clicked if the menu is to stay up or close, whether a sub-menu is to act as a most recently used type menu (i.e., bubbling up the last command chosen from the sub-menu), and comparable aspects.

According to other embodiments, the application may align control 204 such as copy and paste control at the top of the menu 202 according to instructions in the custom configuration. Other control components of the menu 202 such as sub menu launcher 206 or navigation control 208 may be positioned as anchors according to default schema instructions found in the custom configuration. Anchor schema instructions may not be user editable in order to provide a consistent context based menu experience to the user.

According to yet other embodiments, the application may provide a context based menu 210 customized according to custom configuration based on platform requirements. The application may choose to load a different shape menu according to platform requirements (such as limited screen space). The application may position controls such as control 214 in relative positions as defined in the custom configuration of menu 202. The application may also position anchor controls such as navigation control 212 for providing navigation functionality in a relative position to carry over the custom configuration experience from menu 202 in a different platform served by menu 210.

According to further embodiments, the application may retrieve a default schema from the custom configuration defining default position information about a set of controls in the context based menu. The application may position the set of controls in the context based menu according to the default schema. The default schema may provide default position and behavior for controls in the context based menu. A user or developer may overwrite default position information in the custom configuration by editing the XML file. The application may retrieve custom position information about the set of controls from the custom configuration. Subsequently, the application may position the set of controls in the context based menu using location and rotation information retrieved from the custom position information. Location information may enable the user to reorder controls. Rotation information may enable the user to reorient a control, or increase/decrease a number of elements on the menu (e.g., more or fewer than eight elements). However, both location and rotation information may be limited by the system to prevent a user from overlapping controls or having a high number of controls in a menu preventing usability.

According to some embodiments, the application may add a control to the context based menu in response to detecting inserted control information into the custom configuration. A user or developer may be enabled to provide attribute information such as location, rotation, size, descriptive text, and background of the control. Similarly, the application may remove a control from the context based menu in response to detecting removed control information from the custom configuration.

Although example embodiments are shown in the figures employing a radially shaped context based menu, embodiments are not limited to radially shaped menus and may be implemented in other forms such as rectangular shaped menus, arch shaped menus, linear shaped menus, etc.

Figure 3:
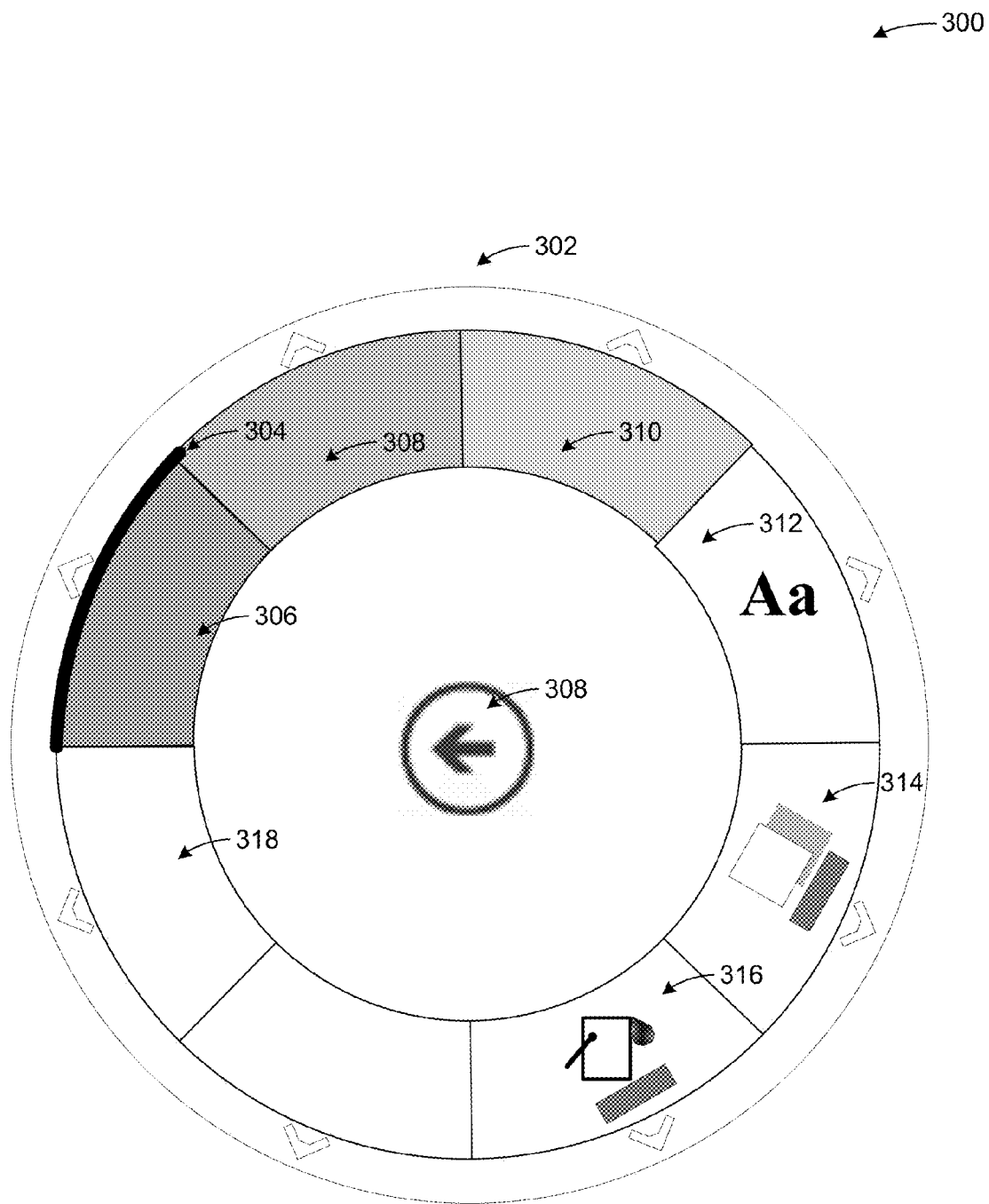
FIG. 3 illustrates another example context based menu combining controls from multiple menus according to embodiments.

FIG. 3 illustrates another example context based menu combining controls from multiple menus according to embodiments. Diagram 300 displays example context based menu 302 providing frequently used controls.

According to some embodiments, the menu 302 may provide color controls 306, 308, and 310 to assign a color to content. The color controls may be dynamically positioned by the application in the menu 302 according to use patterns. The application may place high frequency controls close to a convenient location of the menu. In other examples, most recently used controls may be placed at predefined locations instead of most frequently used controls. A convenient location may be user dependent and may be determined by evaluating user input patterns. The menu 302 may also display indicator 304 to show the last activated control such as color control 306 that may have been activated to assign an associated color to the content.

According to other embodiments, the application may retrieve control attribute information from the custom configuration to place controls in menu 302. The application may position font control 312, highlight control 314, and fill control 316 into the menu 302 according to the custom configuration. The custom configuration may define positions and order for all controls in menu 302. Alternatively, the positions may be dynamically altered according to use patterns as described above. The application may also have empty control slots where controls may have been removed from the custom configuration by a user such as in slot 318. Furthermore, the application may place an anchor control to a predetermined position as required by application settings. An anchor control such as navigation control 308 may not be customizable. Alternatively, the application may provide limited customization to anchor controls such as enabling a user to adjust the size of an anchor control within a predetermined range.

According to yet other embodiments, the application may retrieve behavior information about a control from the custom configuration. The behavior information may include a variety of behaviors for the control including how to respond to a user input, animation associated with activation, behavior within a set of controls, limits on execution of functionality, when a command is clicked if the menu is to stay up or close, whether a sub-menu is to act as a most recently used type menu, etc. The application may apply the behavior to the control in the context based menu to modify a default behavior of the control. The default behavior may be defined by a schema for a default context based menu embedded into the XML file.

According to further embodiments, the application may determine frequency of a user input on a control in the context based menu. The application may keep count the number of control activations. Additionally, the application may classify activations according to user action such as a tap action or a swipe action. Next, the application may move the control to another location in the context based menu to ease access to the control based on determined frequency matching a threshold. The threshold may be system defined to sort controls according to activation frequency. There may be multiple thresholds corresponding to regions in the menu to enable a control to be eligible for placement within a region of the menu. Alternatively, the application may remove the control from the context based menu according to the determined frequency falling below a threshold. The application may remove seldom used controls from the menu to enable a user to add other controls. In other examples, commands may be added to the menu based on a prediction of what the user may do next. This may be accomplished by observing at what multiple users do or observing at what a particular user does and extrapolating based on what they are doing now what they may be doing next.

According to some embodiments, the application may determine frequency of a user input on a control in another context based menu or any other user interface. The application may move the control from the other context based menu into the context based menu according to the determined frequency matching a threshold. The application may move frequently used controls from sub menus into a top level menu.

Figure 4:
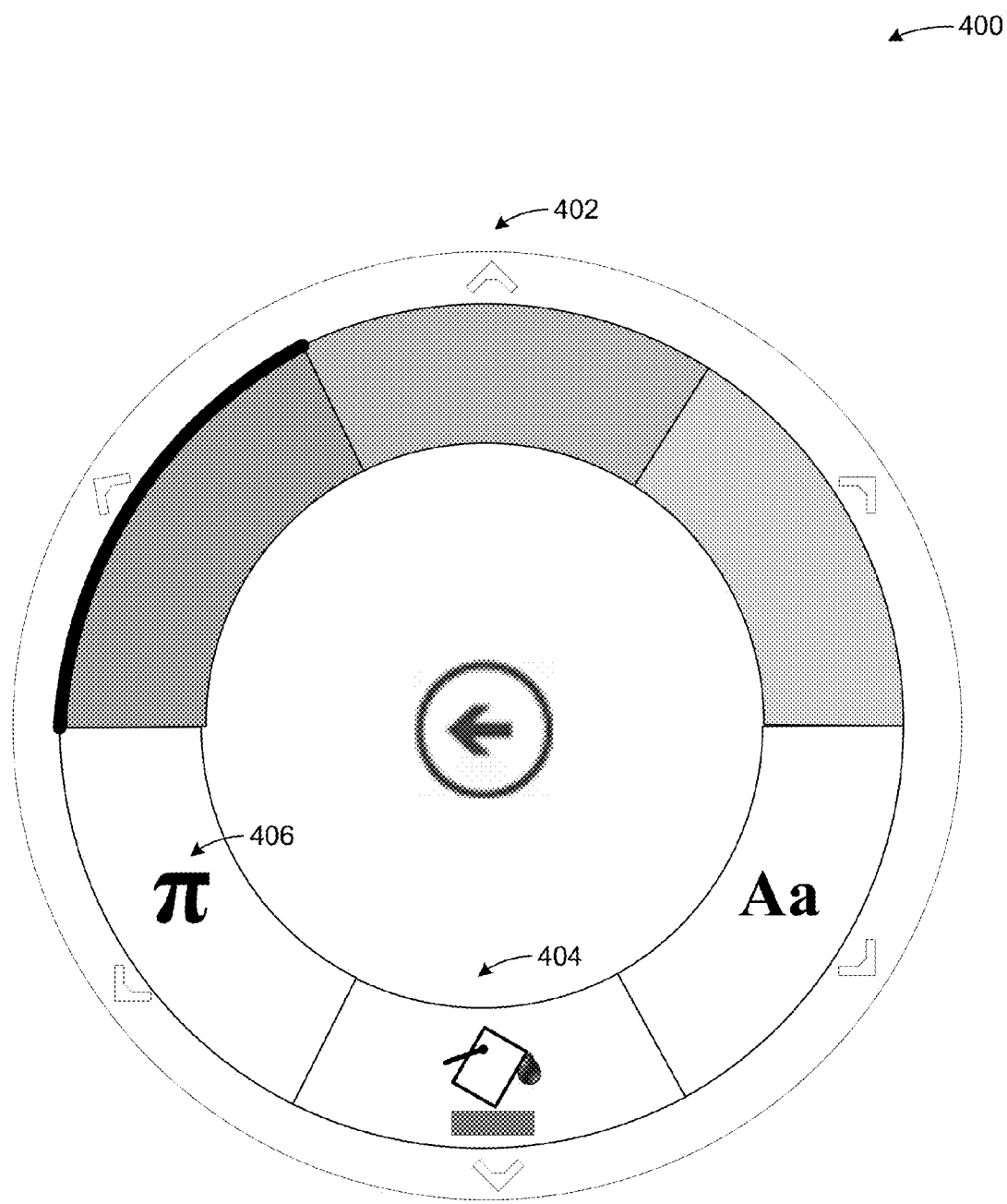
FIG. 4 illustrates an example context based menu with resized controls to encompass the menu according to embodiments.

FIG. 4 illustrates an example context based menu with resized controls to encompass the menu according to embodiments. Diagram 400 displays example context based menu 402 executing a variety of user inputs.

According to some embodiments, the menu 402 may have controls 404 with adjusted sizes to encompass the menu 402. The application may adjust an angle arc of a control size to encompass the menu 402 according to added or removed controls such as fill control 404. The application may also load another control 406 providing functionality to launch a context based menu of equation controls. The user may add the control 406 to the custom configuration to further customize provided controls by the menu. The application may adjust the size of the controls dynamically to encompass the menu. Through the architecture according to embodiments, a developer extending a context based menu may be enabled to define any user interface they want that is in the shape of the menu. As a result, tapping on an equation may expose a calculator or a new equation editor with commands arranged in a circle, for example. By mapping specific points on the circle (specifically angles and magnitude from the center) to user actions, a developer can specify what the action is. A developer may also be enabled to define new custom contexts. For example, they may be enabled to define an add-in to support equations. They may then define a whole new context for an equation menu along with all of the elements within that menu in entirety.

According to other embodiments, the application may position a first set of controls in a context based menu according to position information retrieved from the custom configuration. The application may also position a second set of controls in the menu according to a default schema retrieved from the custom configuration such as anchor controls. Subsequently, the application may determine platform settings for a platform type presenting the context based menu. The application may position the first and second sets of controls according to the platform settings enforced on the menu by the platform type. The platform settings may include size limitations or shape limitations according to a platform type such as a mobile platform with limited display surface.

According to yet other embodiments, the application may receive user authentication information for a user associated with the custom configuration from another device. Other devices may include alternative mobile devices, etc. The application may transmit instructions to construct the context based menu in the other device according to the custom configuration. The application may enable consistent custom menu experience across devices.

According to further embodiments, the application may adjust the number of controls to display in the context based menu dynamically according to use pattern of the first and second sets of controls by a user. Frequency of activations may be utilized to place the controls in the menu as described above. Additionally, the application may either expand or shrink the size of each of the first and second sets of controls to encompass the context based menu according to displayed number of controls. The application may maximize the utilization of menu surface by adjusting the size of the controls.

Figure 5:
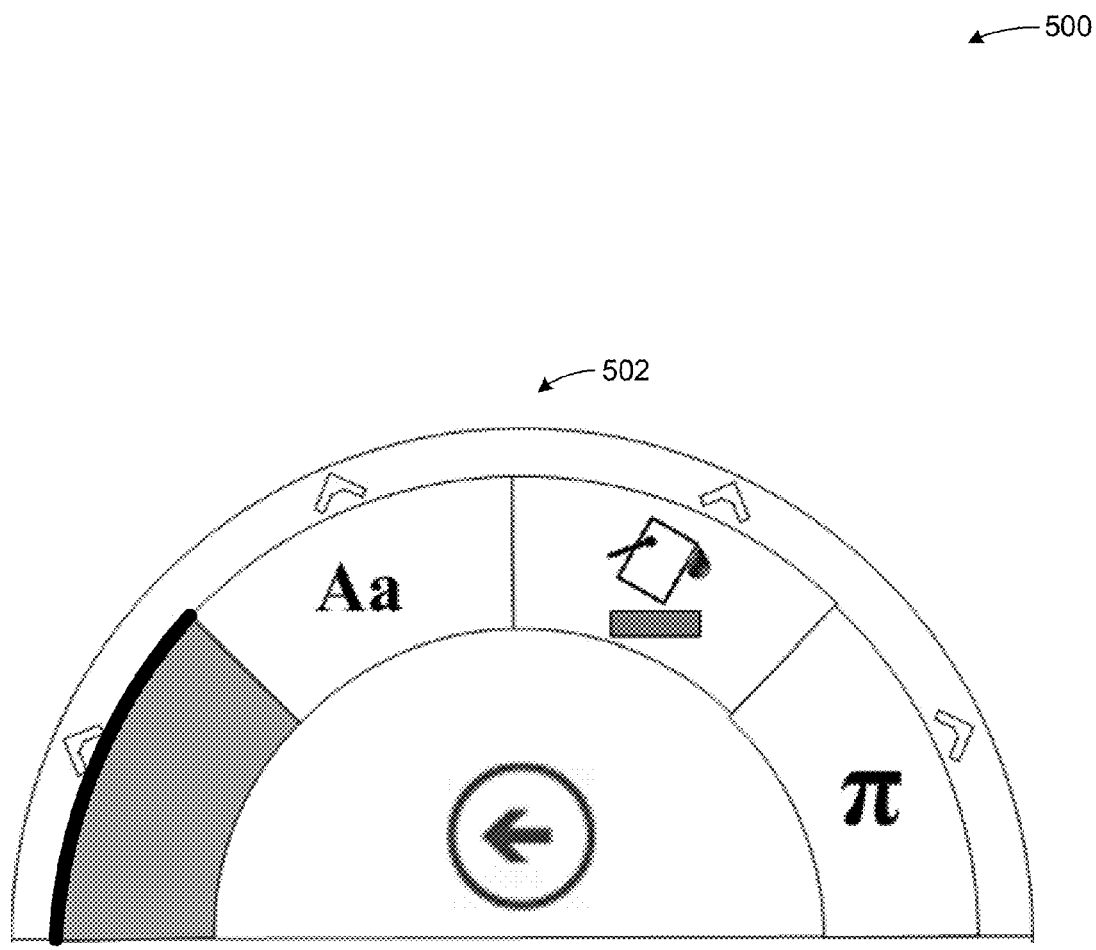
FIG. 5 illustrates an alternatively shaped context based menu with custom controls according to embodiments.

FIG. 5 illustrates an alternatively shaped context based menu with custom controls according to embodiments. Diagram 500 displays context based menu 502 reshaped to display frequently used controls.

According to some embodiments, the application may disable customization of anchor controls from a set of controls. The application may position the set of controls according to custom position information retrieved from the custom configuration. The application may position the anchor controls according to a default schema. The default schema may be embedded within the custom configuration or may be retrieved from another source such as system settings. The application may enforce placement of anchor controls in predetermined locations in the menu to enforce consistent presentation of the menu.

According to other embodiments, the application may also shrink the size of the context based menu in response to a determination of number of the set of controls below a threshold provided by the custom configuration. In addition, the application may adjust the shape of the context based menu in response to a determination of number of set of controls to optimally fill the context based menu. The application may provide a minimal shape to fit number of controls fewer than default.

The example commands, links, submenus, configurations, and context based menus depicted in FIGS. 1 through 5 are provided for illustration purposes only. Embodiments are not limited to the shapes, forms, and content shown in the example diagrams, and may be implemented using other textual, graphical, and similar schemes employing the principles described herein.

Figure 6:
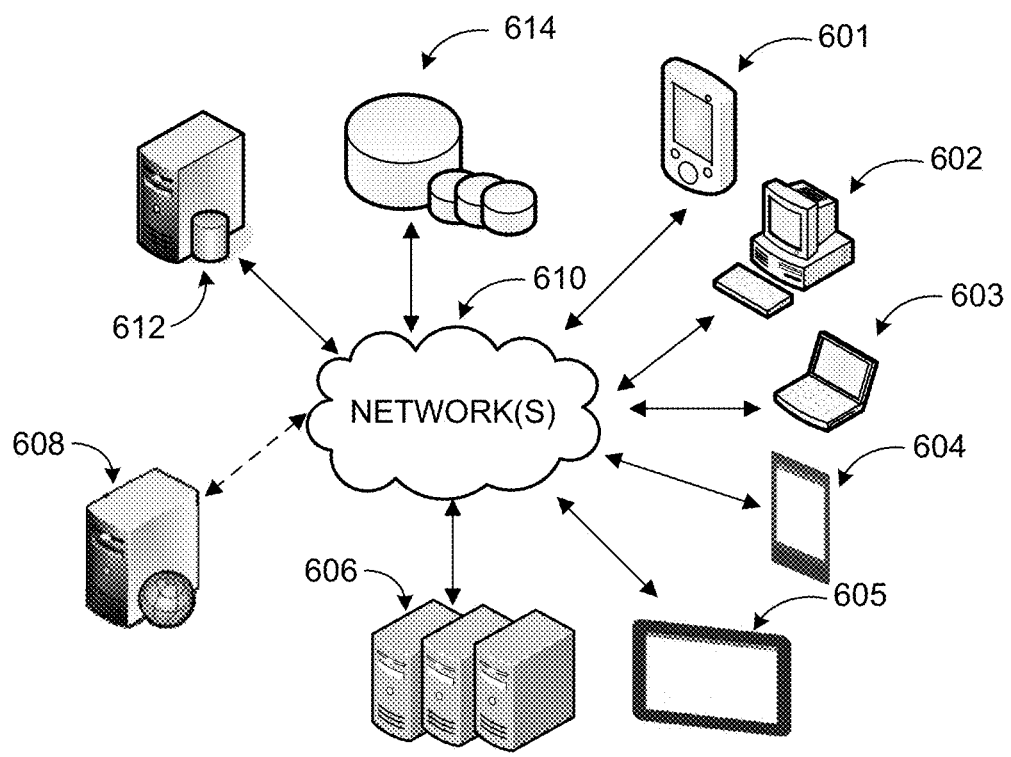
FIG. 6 is a networked environment, where a system according to embodiments may be implemented.

FIG. 6 is a networked environment, where a system according to embodiments may be implemented. In addition to locally installed applications, such as application 722 discussed below, a context based menu for touch and/or gesture enabled devices may be also be employed in conjunction with hosted applications and services that may be implemented via software executed over one or more servers 606 or individual server 608. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

As previously discussed, a context based menu may be customized to manage content provided by the hosted service or application. For example, a browser application, a word processing application, a spreadsheet application, a calendar application, a note taking application, a graphics application, and comparable ones may make use of a context based menu with customized control placements according to embodiments. The context based menu may be activated through a variety of user actions such as selection of content, activation of a launcher indicator, detection of a predetermined touch or gesture action, etc.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, data sources, and data distribution systems may be employed to provide customization of context based menu. Furthermore, the networked environments discussed in FIG. 6 are for illustration purposes only. Embodiments are not limited to the example applications, modules, or processes.

Figure 7:
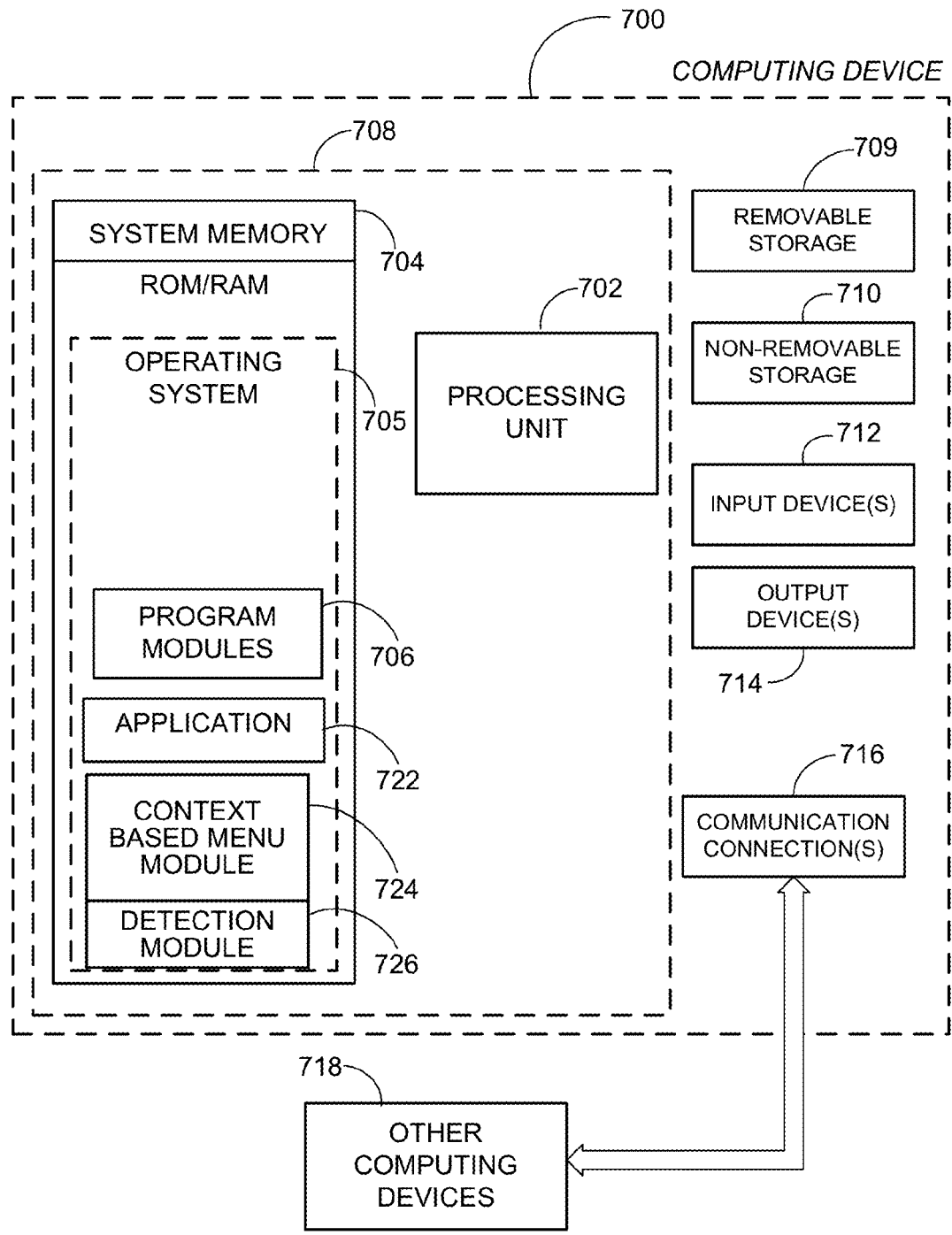
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment according to embodiments is illustrated, such as computing device 700. In a basic configuration, computing device 700 may be any device in stationary, mobile, or other form such as the example devices discussed in conjunction with FIG. 1A, 1B, and 6, and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS®, WINDOWS MOBILE®, or WINDOWS PHONE® operating systems from MICROSOFT CORPORATION of Redmond, Wash. The system memory 704 may also include one or more software applications such as program modules 706, application 722, context based menu module 724, and detection module 726.

Context based menu module 724 may operate in conjunction with the operating system 705 or application 722 and provide a context based menu with custom controls as discussed previously. Context based menu module 724 may also provide commands, links, and submenus to manage content. Detection module 726 may detect user inputs and execute a command associated with the input to manage content. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, an optical capture device for detecting gestures, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, other directory or policy servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
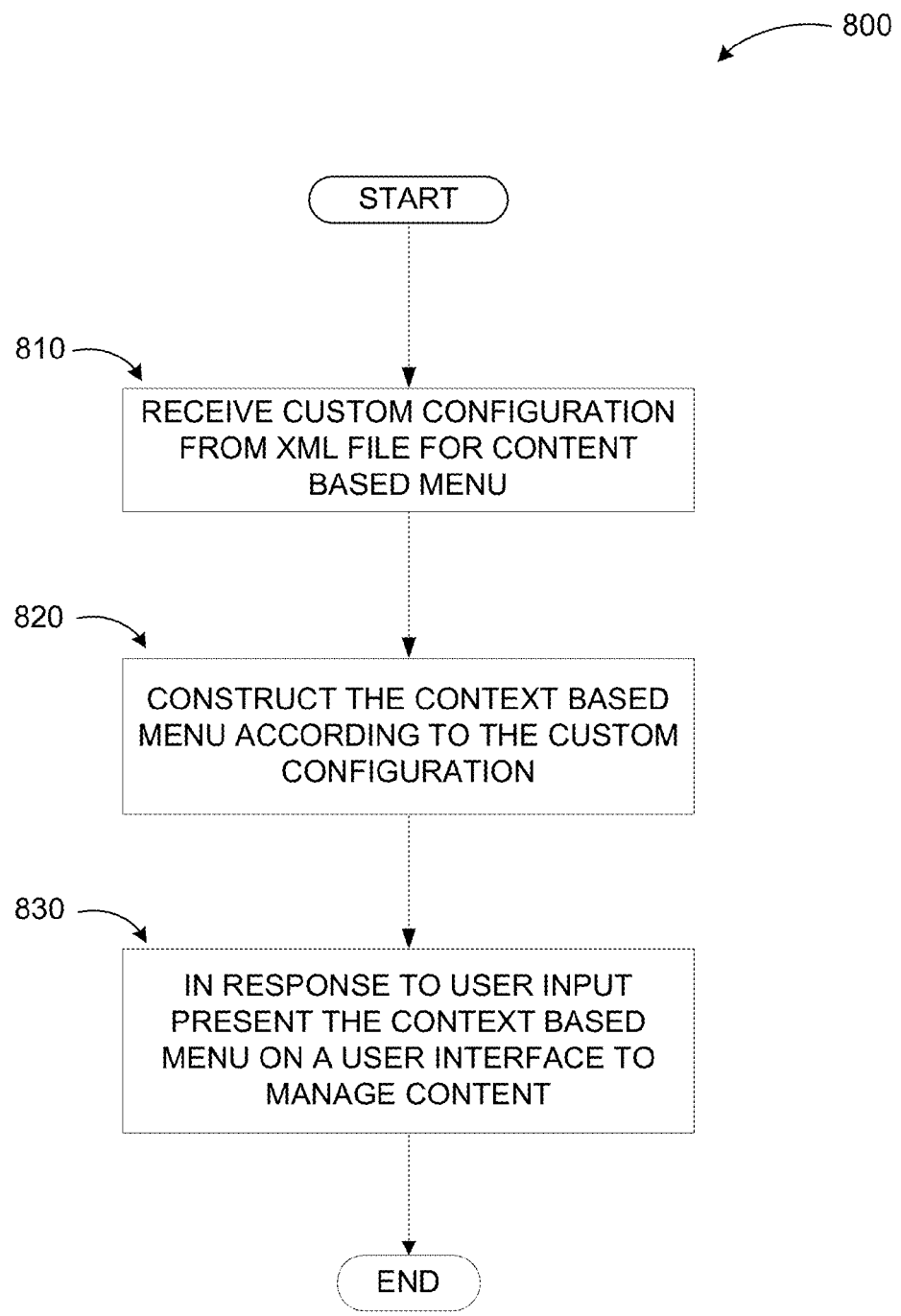
FIG. 8 illustrates a logic flow diagram for a process of providing customization of context based menu in touch and gesture enabled devices according to embodiments.

FIG. 8 illustrates a logic flow diagram for a process of providing customization of context based menu in touch and/or gesture enabled devices according to embodiments. Process 800 may be implemented as part of an application or an operating system of any computing device capable of accepting touch, gesture, keyboard, mouse, pen, or similar inputs.

Process 800 begins with operation 810, where an application may receive custom configuration from an extensible markup language (XML) file for a context based menu or from a user interface exposed to a user. The configuration may have position and rotation information for placement of controls into the context based menu. Subsequently, the application may construct the context based menu according to the custom configuration at operation 820. The custom configuration may be user editable and may be transmitted to other platforms to provide consistent context based menu experience with customized controls. At operation 830, the application may present the context based menu on a user interface to manage the content in response to a user input including a tap, a swipe, a mouse, a keyboard, a pen, a voice, a visual, and a gesture action.

The operations included in process 800 are for illustration purposes. Providing customization of context based menu according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above.

Rather, the specific features and acts described above are disclosed as example forms of implementing the claims and embodiments.

What is claimed is:

1. A method executed in a computing device for providing customization of context based menus, the method comprising:
receiving a custom configuration from one of a structured file and a user input through a user interface for a context based menu defining layout attributes and a behavior for a first set of controls and a second set of controls in the context based menu, wherein the context based menu is a radial menu;
constructing the context based menu according to the custom configuration, wherein the custom configuration is editable by a user;
positioning the first set of controls in the context based menu according to custom position information retrieved from the custom configuration;
retrieving a default schema from the custom configuration defining default position information about the second set of controls in the context based menu;
positioning the second set of controls in the context based menu according to the default schema retrieved from the custom configuration;
adjusting one or more from a set of: a number of the first set of controls and a number of the second set of controls to be displayed in the context based menu dynamically according to a use pattern of one or more from a set of: the first set of controls and the second set of controls by the user;
in response to the user input including a tap, a swipe, a mouse, a keyboard, a pen, a voice, a visual, and a gesture action, presenting the context based menu on the user interface to manage content; and
displaying an indicator to show a last activated control of the context based menu.

2. The method of claim 1, further comprising:
receiving the custom configuration from an extensible markup language (XML) file.

3. The method of claim 1, further comprising:
retrieving custom position information about the first set of controls from the custom configuration; and
positioning the first set of controls in the context based menu using location and rotation information retrieved from the custom position information.

4. The method of claim 1, further comprising:
adding a control to the context based menu in response to detecting inserted control information in the custom configuration.

5. The method of claim 1, further comprising:
deleting a control from the context based menu in response to detecting removed control information from the custom configuration.

6. The method of claim 1, further comprising:
applying the behavior defined by the custom configuration to one or more controls, wherein the behavior includes at least one from a set of: how to respond to the user input, animation associated with activation, animation associated with one or more controls, limits on execution of functionality, whether the context based menu closes upon execution of a selected command, and, whether a sub-menu is to act as a most recently used type context based menu.

7. The method of claim 1, further comprising:
selecting one or more controls to be displayed on the context based menu based on predicting a user behavior extrapolated from interactions of one or more users with one of the context based menu and other user interfaces.

8. The method of claim 1, further comprising:
determining a frequency of user interaction with a control in the context based menu; and
one of:
moving the control to another location in the context based menu to ease access to the control based on the determined frequency matching a predefined threshold; and
removing the control from the context based menu based on the determined frequency falling below the predefined threshold 9. The method of claim 1, further comprising:
enabling a developer to define one or more of a layout, the behavior, and an appearance of controls on the context based menu by mapping coordinates on the context based menu to user actions and allowing the developer to specify the user actions.

10. The method of claim 1, further comprising:
determining a frequency of user interaction with a control in another user interface; and
moving the control from the other user interface into the context based menu based on the determined frequency matching a predefined threshold.

11. A computing device for providing customization of context based menus, the computing device comprising:
an input device configured to detect at least one of a tap action and a swipe action;
a memory;
a processor coupled to the memory, the processor executing an application and causing a user interface associated with the application to be displayed on a screen, wherein the processor is configured to:
receive a custom configuration from one of a structured file and a user input through the user interface for a context based menu defining layout attributes and a behavior for a first set of controls and a second set of controls in the context based menu, wherein the context based menu is a radial menu;
construct the context based menu according to the custom configuration, wherein the custom configuration is editable by a user;
position the first set of controls in the context based menu according to custom position information retrieved from the custom configuration;
retrieve a default schema from the custom configuration defining default position information about the second set of controls in the context based menu;
position the second set of controls in the context based menu according to the default schema retrieved from the custom configuration;
adjust one or more from a set of: a number of the first set of controls and a number of the second set of controls to be displayed in the context based menu dynamically according to a use pattern of one or more from a set of: the first set of controls and the second set of controls by the user;
in response to the user input including a tap, a swipe, a mouse, a keyboard, a pen, a voice, a visual, and a gesture action, present the context based menu on the user interface to manage content; and
display an indicator to show a last activated control of the context based menu.

12. The computing device of claim 11, wherein the processor is further configured to:

determine platform settings for a platform type presenting the context based menu; and position the first set of controls and the second set of controls according to the platform settings enforced on the context based menu by the platform type.

13. The computing device of claim 11, wherein the processor is further configured to:

receive user authentication information for the user associated with the custom configuration from another device; and transmit instructions to construct the context based menu at the other device according to the custom configuration.

14. The computing device of claim 11, wherein the processor is further configured to:

adjust sizes of each of the first and second set of controls to encompass the context based menu according to the displayed number of controls.

15. A computer-readable memory device including a processor and instructions working in conjunction with said processor for providing customization of context based menus, the instructions comprising:

receiving a custom configuration from one of a structured file and a user input through a predefined user interface for a context based menu defining layout attributes and a behavior for a first set of controls and a second set of controls one or more controls in the context based menu, wherein the context based menu is a radial menu;

constructing the context based menu according to the custom configuration, wherein the custom configuration is editable by a user;

positioning the first set of controls in the context based menu according to custom position information retrieved from the custom configuration;

retrieving a default schema from the custom configuration defining default position information about the second set of controls in the context based menu;

positioning the second set of controls in the context based menu according to the default schema retrieved from the custom configuration;

adjusting one or more from a set of: a number of the first set of controls and a number of the second set of controls to be displaced in the context based menu dynamically according to a use pattern of one or more from a set of: the first set of controls and the second set of controls by the user;

in response to the user input including a tap, a swipe, a mouse, a keyboard, a pen, a voice, a visual, and a gesture action, presenting the context based menu on the user interface to manage content; and displaying an indicator to show a last activated control of the context based menu.

16. The computer-readable memory device of claim 15, wherein the instructions further comprise:

preventing customization of anchor controls from the set of controls; and positioning the anchor controls according to the default schema.

17. The computer-readable memory device of claim 15, wherein the instructions further comprise:

reducing a size of context based menu in response to a determination of the number of the set of controls falling below a predefined threshold provided by the custom configuration.

18. The computer-readable memory device of claim 15, wherein the instructions further comprise:

adjusting a shape of the context based menu in response to a determination of the number of the set of controls to populate the context based menu.

* * * * *